Aug. 9, 1927.
H. E. HANSON
WELL SCREEN
Filed May 16, 1925
1,638,731
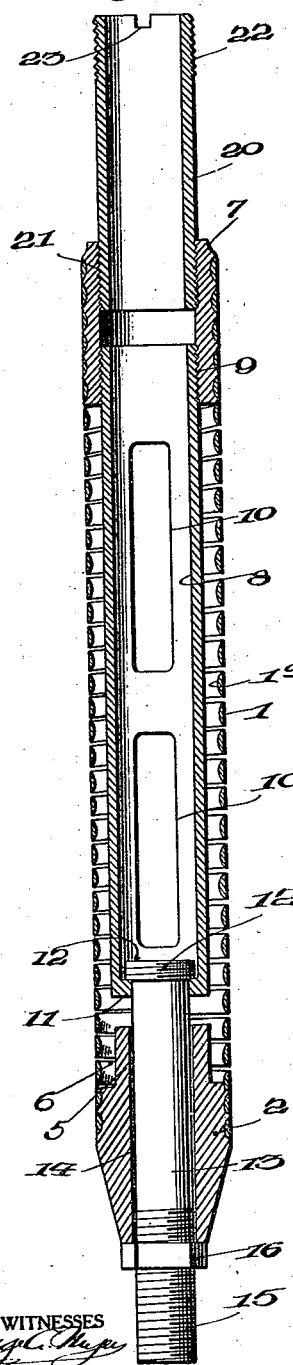
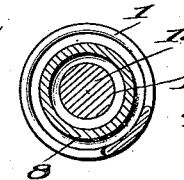
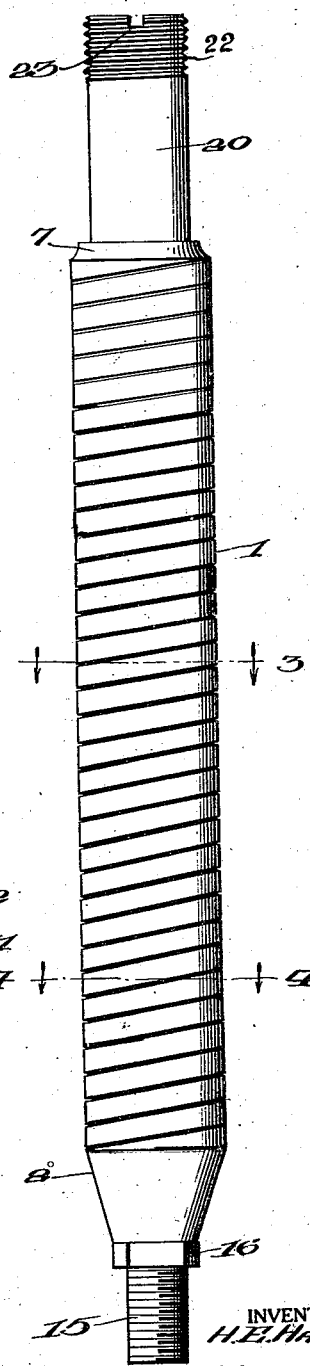
WITNESSES
INVENTOR
H. E. HANSON,
BY
ATTORNEYS Patented Aug. 9, 1927.

1,638,731

UNITED STATES PATENT OFFICE.

HENRY E. HANSON, OF NEVIS, MINNESOTA.

WELL SCREEN.

Application filed May 16, 1925. Serial No. 30,809.

This invention relates to an improvement in well screens of the type forming the subject matter of my prior patent granted April 24, 1917, #1,223,969.

The present invention aims to provide a well screen of this type which is susceptible of comparatively inexpensive manufacture from materials and by means of facilities ordinarily available; which may be readily adjusted prior to its introduction into the well, and while in position in the well, and which affords a better trap for the fine sand passing through the screen than in the constructions heretofore proposed.

Other objects and advantages reside in certain novel features of the construction, arrangement and combination of parts which will be hereinafter more fully described and particularly pointed out in the appended claims, reference being had to the accompanying drawings forming a part of this specification, and in which:—

Figure 1 is a view partly in section and partly in elevation showing a well screen constructed in accordance with the present invention, Figure 2 is a view in elevation of the well screen shown in Figure 1, Figure 3 is a view in horizontal section on the line 3—3 of Figure 2, and Figure 4 is a similar view on the line 4—4 of Figure 2.

Referring to the drawings, the numeral 1 designates the screen body which is constructed of a spring or a spirally wound strip of spring or resilient metal. The convolutions of the strip of spring 1 have rounded inner faces 1ª to prevent particles of sand from lodging on or between the convolutions. A lower head 2 is provided and has a reduced extension 5 at its upper end. In the assembly the lower end of the spring screen body 1 threads into a spiral groove provided in the periphery of the lower head 2. The space between the outer periphery of the reduced extension 5 and the inside of the surrounding portion of the spring screen body 1 is designated at 6 and constitutes a trap for the fine sand which enters the spring screen body. At the upper end of the spring screen body an upper sleeve-like head 7 is provided and has a spiral groove in its outer periphery with which the convolutions of the upper end of the spring screen body are engageable as shown in Figure 1.

An inner tubular shell 8 is provided within the spring screen body 1 and has its upper end threadedly connected to the lower end of the upper head 7 as indicated at 9. A number of elongated slots 10 are formed in the periphery of the inner shell 8 and permit the water or fluid to enter the interior of the shell from the inside of the spring screen 1. At its lower end the inner shell 8 is formed with an inturned annular flange 11 on which an out-turned annular flange 12 formed on the upper end of an adjusting rod 13 is rotatably fitted. The adjusting rod 13 is rotatably and slidably fitted in a lengthwise opening 14 provided in the lower head 2. Adjacent its lower end the rod 13 is exteriorly threaded as indicated at 15, and with such threaded end a nut 16 coacts. The nut 16 also engages the lower end of the head 2. The shell 8 provides an inner trap for the fine sand, and also takes part in the adjustment of the spring screen body.

A short pipe 20 has its lower end threadedly connected as at 21 with and suitably fixed to the upper end of the head 7. The upper end of the pipe 20 is externally threaded as at 22 to adapt it for connection with internal threads on a coupling member connected to the well pipe, or on internal threads on the well pipe itself. Diametrically opposite slots 23 are provided in the upper end of the short pipe 20 and are adapted for engagement with lugs or with the jaws of a wrench carried on the lower end of a suitable rod to permit of adjustment of the spring screen from above the surface of the ground when the screen is in position in the well.

In adjusting the spring screen body prior to introducing the screen into the well, either nut 16 or the head 7 is manipulated to cause the convolutions of the spring screen body to move nearly together or to be drawn farther apart in order to provide interstices of proper size between the convolutions of the spring screen body. When the screen is in position in the well and it is considered desirable to elongate or contract the spring screen body in order to change the size of the interstices between the convolutions thereof, a suitable rod is lowered down through the well and the lugs or wrench jaws provided on the lower end of such rod are engaged with the slots 23 of the pipe 20. In this way the pipe 20 may be turned to cause the head 7 to be turned. The turning of the head 7 causes the convolutions of the spring screen body 1 engaged with such head to be moved further onto the head or to be moved off of the same according to the adjustment desired. If more convolutions of the spring screen body 1 are drawn onto the head 7, the size of the interstices between the convolutions of the spring screen body is increased, whereas this size is decreased if the head 7 is turned to move the convolutions of the spring screen body off the head.

The periphery of the flange 12 is threaded, as at 12ª, to adapt it for connection with an internally threaded socket of a rod adapted to be lowered through the well and engaged with the flange in this way for pulling the screens out of the well.

Another purpose of the rod 13 and nut 16 is to give the desired amount of slack when removing the screen from the well as at such time an up and down movement will tend to loosen the screen more easily from the sand.

A rod is used in connection with the flange 12 for raising or pulling the screens out of the well only when two or more screens are used. It will no doubt be obvious that two or more screens may be used by omitting the lower head 2 and rod 13 from the upper screen or screens and threading the spiral spring screen body into the convolutions of the upper head 7 of the lower screen or screens. With such an arrangement the additional weight would tend to distort the spiral screen bodies unless a support were provided at the lower end. The rod with the socket externally threaded flange 12 provides such a support.

It is usually desirable to adjust or set the nut 16 before putting the screen in the well so that any desired slack may be secured. If, for example, the nut 16 is set to allow a one-half inch slack the head 12 will then be one-half inch above the flange of the shell 8 when the screen is in the well due to the engagement of the lower part of the rod 13 with the sand. This facilitates the removal of the screen when removal is necessary or desirable.

I claim:—

1. A well screen having a spring screen body made up of a plurality of convolutions and means for varying the distances between the convolutions while the well screen is in the well, and including a head having spiral grooves engaged with certain of said convolutions, and means fixedly connected with the head and adapted to be turned from above the ground whereby the head is turned to adjust the spring screen.

2. In a well screen, a spring screen body made up of a plurality of convolutions, an inner shell located within the body and having its lower end closed, the periphery of the shell also being closed except for the provision of slots, a head at the upper end of the spring screen body having an opening threadedly connected with the upper open end of the inner shell, a head at the lower end of the spring screen, and means for securing the shell to said head, the spring screen defining with said head an outer trap for the fine sand, the inner shell defining a separate inner trap for the fine sand escaping the outer trap.

3. A well screen having a spring screen body made up of a plurality of convolutions and means for varying the distance between the convolutions while the well screen is in the well, and including a head having spiral grooves engaged with certain of said convolutions, and means fixedly connected with the head and adapted to be turned from above the ground whereby the said head is turned to adjust the spring screen, said last mentioned means comprising a short pipe connected with the head and having slots at its upper end adapted for engagement with a suitable tool whereby the same may be turned from above the ground.

4. In a well screen, a spring screen body made up of a plurality of convolutions, an upper head for the upper end of the body having a spiral groove receiving certain of the convolutions, a lower head having a spiral groove receiving the convolutions at the lower end of the screen body, an inner shell having its upper end connected to the upper head, said shell having an inturned flange at its lower end, a rod adjustably connected to the lower head and having an outturned flange co-acting with the inturned flange of the shell, said outturned flange being threaded and adapted to co-act with an internally threaded socket on a suitable rod.

5. In a well screen, a spring screen body made up of a plurality of convolutions, a sleeve-like head for the upper end of the body having peripheral grooves in which certain of the convolutions of the body are adjustably fitted, a lower head connected with the lower end of the body and having an axial opening, an inner shell having its upper end connected to the upper head, said shell having peripheral slots and having an inturned flange at its lower end, a rod extending into the lower end of the shell and through the opening of the lower head, said rod having an out turned flange engageable with the inturned flange, said rod being rotatably and slidably fitted in the lower head and projecting downwardly below the same, and a nut threaded on the lower end of the rod and engageable with the lower head.

HENRY E. HANSON.